US010967839B2

(12) United States Patent
VanAntwerp et al.

(10) Patent No.: US 10,967,839 B2
(45) Date of Patent: Apr. 6, 2021

(54) SYSTEMS, VEHICLES, AND METHODS FOR CONTROLLING TRAILER BRAKE OUTPUT IN COLLABORATION WITH DYNAMIC ELECTRONIC PARKING BRAKE

(71) Applicant: Toyota Motor Engineering & Manufacturing North America, Inc., Plano, TX (US)

(72) Inventors: Adam VanAntwerp, Chelsea, MI (US); Corey Zwegers, Dexter, MI (US); Stephen Robertson, Surprise, AZ (US); Takayuki Goto, Yokohama (JP); Yuichi Shimizu, Okazaki (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 281 days.

(21) Appl. No.: 16/263,456

(22) Filed: Jan. 31, 2019

(65) Prior Publication Data
US 2020/0247372 A1 Aug. 6, 2020

(51) Int. Cl.
| | | |
|---|---|---|
| *B60T 8/17* | (2006.01) | |
| *B60T 13/66* | (2006.01) | |
| *B60T 8/174* | (2006.01) | |
| *B60T 8/1755* | (2006.01) | |
| *B60T 7/20* | (2006.01) | |
| *B60T 17/22* | (2006.01) | |

(52) U.S. Cl.
CPC ............. *B60T 8/1708* (2013.01); *B60T 7/20* (2013.01); *B60T 8/174* (2013.01); *B60T 8/17551* (2013.01); *B60T 13/662* (2013.01); *B60T 17/22* (2013.01)

(58) Field of Classification Search
CPC ...... B60T 8/1708; B60T 13/662; B60T 8/174; B60T 8/17551; B60T 7/20; B60T 17/22
See application file for complete search history.

(56) References Cited

U.S. PATENT DOCUMENTS

| | | |
|---|---|---|
| 7,832,813 B2 | 11/2010 | Bensch et al. |
| 8,152,243 B2 | 4/2012 | Bensch et al. |
| 9,550,479 B2 | 1/2017 | Kim |
| 9,561,784 B2 | 2/2017 | Casali et al. |
| 9,809,206 B2 | 11/2017 | Hummel et al. |

(Continued)

FOREIGN PATENT DOCUMENTS

| | | |
|---|---|---|
| CN | 107709108 A | 2/2018 |
| EP | 2783928 B1 | 5/2018 |
| WO | 2017021400 A1 | 2/2017 |

*Primary Examiner* — Sze-Hon Kong
(74) *Attorney, Agent, or Firm* — Dinsmore & Shohl LLP (57) ABSTRACT

A vehicle control system of a vehicle includes a trailer brake control electronic control unit (ECU), which in turn includes a trailer brake output circuit. The trailer brake control ECU is configured to receive an electronic parking brake (EPB) state flag and a vehicle acceleration message. The dynamic EPB state flag indicates one of an ON state and an OFF state of a dynamic EPB, and the vehicle acceleration message indicates an acceleration of the vehicle. The trailer brake control ECU outputs, via the trailer brake output circuit, a trailer brake signal based on the acceleration of the vehicle indicated by the received vehicle acceleration message in response to determining that the received dynamic EPB state flag indicates the ON state.

20 Claims, 5 Drawing Sheets

(56) References Cited

U.S. PATENT DOCUMENTS

| | | | |
|---|---|---|---|
| 2010/0152989 A1* | 6/2010 | Smith | B60T 7/085 |
| | | | 701/78 |
| 2018/0154874 A1* | 6/2018 | Kulkarni | H01M 4/8814 |
| 2019/0248349 A1* | 8/2019 | Wulf | B60W 10/188 |
| 2019/0366989 A1* | 12/2019 | James | B60T 8/323 |
| 2020/0023827 A1* | 1/2020 | Van Thiel | B60T 7/04 |
| 2020/0031326 A1* | 1/2020 | Henriksson | B60T 8/1708 |
| 2020/0055511 A1* | 2/2020 | Schwagmeyer | B60T 8/1708 |

* cited by examiner

SYSTEMS, VEHICLES, AND METHODS FOR CONTROLLING TRAILER BRAKE OUTPUT IN COLLABORATION WITH DYNAMIC ELECTRONIC PARKING BRAKE

TECHNICAL FIELD

The present specification generally relates to trailer brake control systems and, more specifically, to systems for controlling trailer brake output circuits based on a state of a dynamic electronic parking brake.

BACKGROUND

Trailers (e.g., recreational trailers, utility trailers, boat trailers, semi-trailers, etc.) may be towed by towing vehicles (e.g., automobiles and trucks). Some trailers include trailer brakes that may be actuated by a trailer brake controller coupled to the towing vehicle. The trailer brake controller may control the trailer brakes via an electric-over-hydraulic trailer braking system or an electric trailer braking system.

An electric-over-hydraulic trailer braking system may include hydraulic trailer brakes and an electric-over-hydraulic brake actuator coupled to the trailer that receives electrical signals from the trailer brake controller and facilitates the application of the hydraulic trailer brakes.

An electric trailer braking system may include electric trailer brakes that are applied when the trailer brake controller provides an electric current to the trailer brakes. The electric trailer brakes may include brake shoes that frictionally engage a drum when activated. In some electric trailer braking system, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

SUMMARY

An embodiment of the present disclosure takes the form of a vehicle control system of a vehicle. The vehicle control system includes a trailer brake control ECU having a trailer brake output circuit, one or more processors, and one or more memory modules comprising machine readable instructions that cause the trailer brake control ECU to perform at least the following when executed by the one or more processors: receive a dynamic EPB state flag indicating one of an ON state and an OFF state of a dynamic electronic parking brake (EPB); receive a vehicle acceleration message indicating an acceleration of the vehicle; and output, via the trailer brake output circuit, a trailer brake output signal based on the acceleration of the vehicle indicated by the received vehicle acceleration message in response to determining that the received dynamic EPB state flag indicates an ON state of the dynamic EPB.

In another embodiment, a vehicle control system of a vehicle includes a trailer brake control electronic control unit (ECU), which in turn includes a trailer brake output circuit. The trailer brake control ECU is configured to receive an electronic parking brake (EPB) state flag and a vehicle acceleration message. The dynamic EPB state flag indicates one of an ON state and an OFF state of a dynamic EPB, and the vehicle acceleration message indicates an acceleration of the vehicle. The trailer brake control ECU outputs, via the trailer brake output circuit, a trailer brake signal based on the acceleration of the vehicle indicated by the received vehicle acceleration message in response to determining that the received dynamic EPB state flag indicates the ON state.

A further embodiment takes the form of a method of controlling a trailer brake output circuit of a vehicle. A trailer brake control electronic control unit (ECU) of the vehicle receives a dynamic electronic parking brake (EPB) state flag and a vehicle acceleration message. The dynamic EPB state flag indicates one of an ON state and an OFF state of a dynamic EPB, and the vehicle acceleration indicates an acceleration of the vehicle. The trailer brake control ECU outputs, via the trailer brake output circuit, a trailer brake signal based on the acceleration of the vehicle indicated by the received vehicle acceleration message in response to determining that the received dynamic EPB state flag indicates the ON state.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
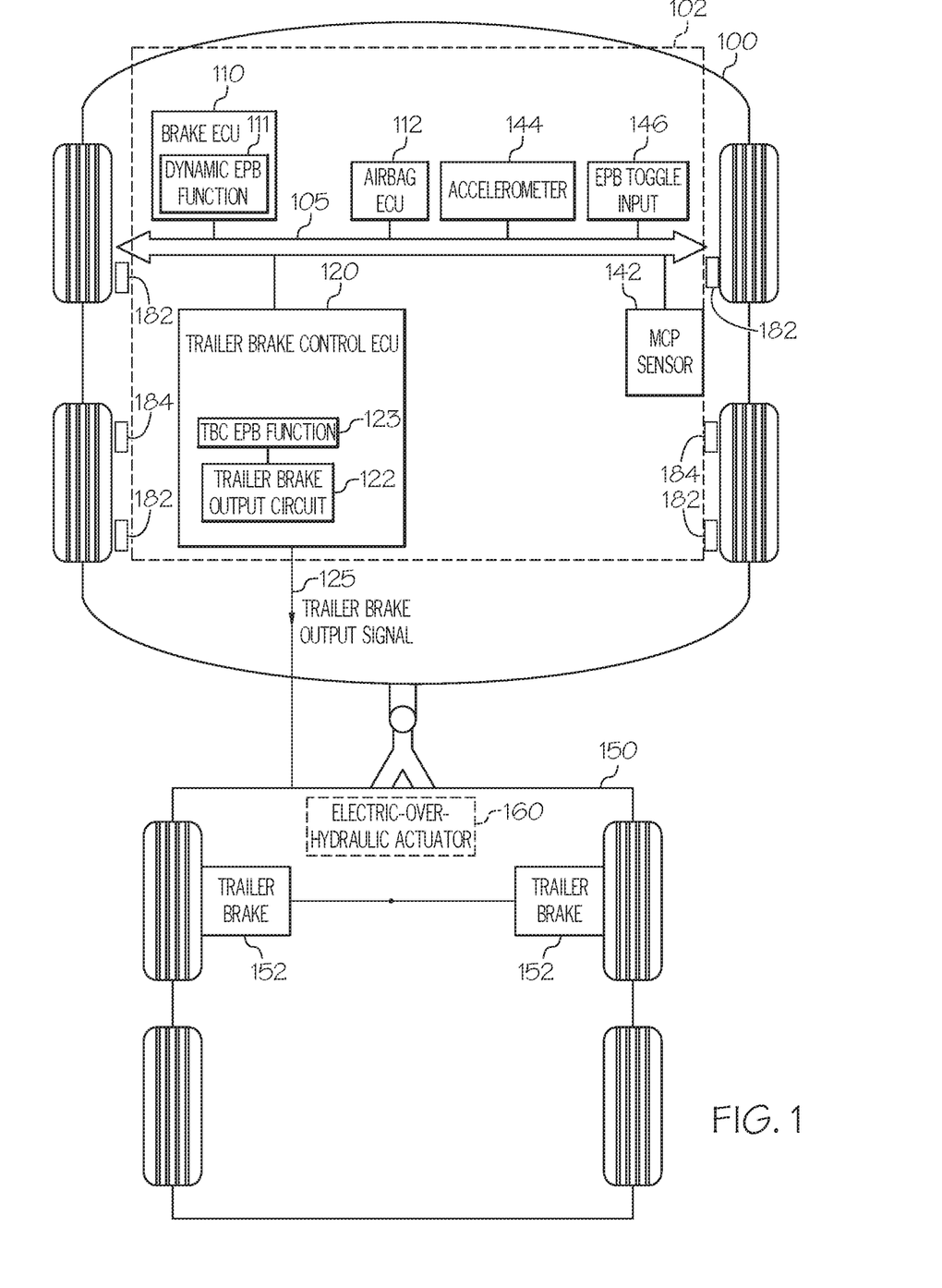
FIG. 1 depicts a towing vehicle and a trailer, according to one or more embodiments shown and described herein.

FIG. 1 depicts a towing vehicle and a trailer, according to one or more embodiments shown and described herein. As shown, a towing vehicle 100 is connected to a trailer 150 comprising a plurality of trailer brakes 152. The towing vehicle 100 includes a vehicle control system 102, a primary brake 182, and an electronic parking brake 184, and may take the form of an automobile or any other passenger or non-passenger vehicle such as, for example, a tractor or a tractor truck.

The trailer 150 may be an unpowered vehicle that includes one or more wheels and that is capable of being pulled by the towing vehicle 100. The trailer 150 could take the form of, for example, a recreational trailer, a utility trailer, a boat trailer, or a semi-trailer, among other possibilities. As depicted in FIG. 1, the plurality of trailer brakes 152 includes two trailer brakes, one coupled to each wheel of the front axle. However, it should be understood that in other embodiments, the plurality of trailer brakes 152 may include more than two trailer brakes, such as in embodiments in which the plurality of trailer brakes 152 includes multiple axles with two trailer brakes associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 102 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

The system 102 includes a brake electronic control unit (ECU) 110, an airbag ECU 112, a trailer brake control ECU 120, a master cylinder pressure (MCP) sensor 142, an accelerometer 144, and an electronic parking brake (EPB) toggle input 146, each of which are communicatively connected via a communication path 105. Any of these ECUs, sensors, or other components may take the form of the ECU described below with reference to FIG. 2. Those of skill in the art will appreciate that the system 102 or any component of the system 102 may include different and/or additional components without departing from the scope of the claims.

The communication path 105 may be formed from any medium that is capable of transmitting a signal such as conductive wires, conductive traces, or optical waveguides, among other examples. Moreover, the communication path 105 may be formed from a combination of mediums capable of transmitting signals. In one embodiment, the communication path 105 comprises a combination of conductive traces, conductive wires, connectors, and buses that cooperate to permit the transmission of electrical data signals to components such as processors, memories, sensors, input devices, output devices, and communication devices. Accordingly, the communication path 105 may comprise a vehicle bus, such as a Local Interconnect Network (LIN) bus, a Controller Area Network (CAN) bus, a Vehicle Area Network (VAN) bus, or any combination of these or other communication paths. Additionally, it is noted that the term "signal" means a waveform (e.g., electrical, optical, magnetic, mechanical or electromagnetic), such as DC, AC, sinusoidal-wave, triangular-wave, square-wave, vibration, etc., capable of traveling through a medium. The communication path 105 communicatively couples the various components of the system 102. As used herein, the term "communicatively coupled" means that coupled components are capable of exchanging data signals with one another such as, for example, electrical signals via conductive medium, electromagnetic signals via air, optical signals via optical waveguides, etc.

The brake ECU 110 is configured to control the primary brake 182, the electronic parking brake 184, and/or any other brakes of the towing vehicle 100, in some cases using a dynamic electronic parking brake (EPB) function 111. The primary brake 182 may comprise actuators on one or more wheels of the towing vehicle 100, and may be controlled based on a master cylinder pressure measurement indicating a pressure applied to a brake pedal of the towing vehicle 100. The MCP sensor 142 may be configured to measure a master cylinder pressure—e.g., corresponding to a driver of the towing vehicle 100 pressing a brake pedal—and the brake ECU 110 may obtain the master cylinder pressure measurement from the MCP sensor 142. The electronic parking brake 184 may control actuators on one or more wheels of the towing vehicle 100, and could take the form of a pull-cable brake system, for example. The electronic parking brake 184 may be enabled and disabled based on input received from the EPB toggle input 146, which could take the form of a button, a switch, a lever, or other input operable by a driver of the towing vehicle 100. The brake ECU 110 may be further configured to transmit a vehicle acceleration message, a dynamic EPB state flag, or other messages to components of the towing vehicle 100 via the communication path 105.

The dynamic EPB function 111 may control the electronic parking brake 184 if the towing vehicle 100 is in motion—e.g., based on a speed, acceleration, or other characteristic of the towing vehicle 100. For example, if the electronic parking brake 184 were activated (e.g., based on input received from the EPB toggle input 146) when the speed of the towing vehicle 100 exceeded a threshold speed, then the dynamic EPB function 111 may operate to prevent actuation or cycle actuation (e.g., repeatedly actuate and release) of the electronic parking brake 184. By preventing or cycling actuation of the electronic parking brake 184, the dynamic EPB function 111 may prevent wheel lock of the towing vehicle 100. As another example, if electronic parking brake 184 were activated when the speed of the towing vehicle 100 were equal to or below the threshold speed, then the dynamic EPB function 111 may operate to actuate the electronic parking brake 184.

The dynamic EPB function 111 may control actuation of the electronic parking brake 184 based on an acceleration value, which in turn may be based on an acceleration of the towing vehicle 100 as measured by the accelerometer 144. The acceleration may be a positive acceleration indicating that the speed of the towing vehicle 100 is increasing, or a negative acceleration (i.e. a deceleration) indicating that the speed of the towing vehicle 100 is decreasing. In an embodiment, the acceleration value takes the form of the acceleration measured by the accelerometer 144. In another embodiment, the acceleration value takes the form of a value generated by the brake ECU 110 by applying zero-point logic to the acceleration measured by the accelerometer 144 so as to decrease variability in the measured acceleration. For example, the brake ECU 110 may generate the acceleration value by determining an acceleration at a point when a driver is judged to begin braking (e.g., based on master cylinder pressure measured by the MCP sensor 142), and then determining future acceleration relative to the acceleration when the driver began braking. It will be understood by those of skill in the art that the accelerometer 144 (or other entity of system 102) may also (or instead) generate the acceleration value based on an acceleration of the towing vehicle 100 as measured by the accelerometer 144, based on a value generated accelerometer 144 by applying zero-point logic to the acceleration measured by the accelerometer 144, or based on other aspects of an acceleration of the towing vehicle 100. The brake ECU 110, the accelerometer 144, or other entity of system 102 may send the acceleration value to one or more other ECUs or components of system 102.

Figure 3:
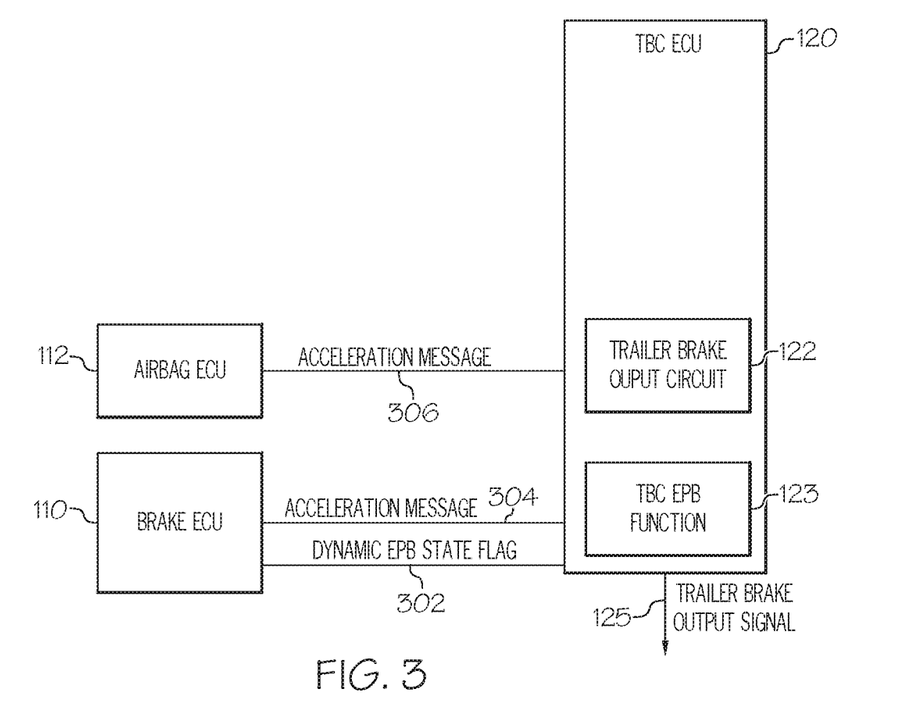
FIG. 3 depicts communication between a brake ECU and a trailer brake control ECU, according to one or more embodiments shown and described herein.

The airbag ECU 112 is configured to control activation of the airbag and to transmit a vehicle acceleration message (perhaps in the manner described above) to other components of the towing vehicle 100 via the communication path 105. The airbag ECU 112 determines the vehicle acceleration message (e.g., vehicle acceleration message 306) to transmit to via the communication path 105 based on the output signal of the accelerometer 144 (e.g., in the manner described above).

The trailer brake control ECU 120 is configured to receive input from other ECUs (e.g., the brake ECU 110 and/or the airbag ECU 112), the MCP sensor 142, the accelerometer 144, and/or the EPB toggle input 146, and output a trailer brake output signal 125, e.g., a pulse-width modulation signal, based on the received input. In the embodiment shown in FIG. 1, the trailer brake control ECU 120 includes a trailer brake output circuit 122 and a trailer brake control electronic parking brake (TBC EPB) function 123. The trailer brake control ECU 120 may output the trailer brake output signal 125 via the trailer brake output circuit 122. The trailer brake output circuit 122 may include one or more electrical components, such as resistors, capacitors, transistors, inductors, and the like. In some embodiments, the trailer brake output circuit 122 may include at least one power transistor, such as a MOSFET transistor.

In embodiments in which the trailer 150 employs an electric trailer braking system, the trailer brake control ECU 120 is electrically coupled to the plurality of trailer brakes 152 via the trailer brake output circuit 122 using a conductive medium, such as a conductive wire. In embodiments in which the trailer 150 employs an electric-over-hydraulic braking system, the trailer brake control ECU 120 is electrically coupled to the electric-over-hydraulic actuator 160 via the trailer brake output circuit 122 using a conductive medium, such as a conductive wire.

The trailer brake output signal 125 may take the form of a voltage or current, directly to the plurality of trailer brakes 152 via the trailer brake output circuit 122 (in embodiments in which the trailer 150 employs an electric braking system) or to the electric-over-hydraulic actuator 160 (in embodiments in which the trailer 150 employs an electric-over-hydraulic braking system) using the conductive medium. In some embodiments, the trailer brake output circuit 122 may supply current from the power system of the towing vehicle 100.

The trailer brake output signal 125 may take the form of a pulse-width modulation signal, for example. In some embodiments, the trailer brake output circuit 122 outputs a trailer brake output signal in response to receiving a pulse-width modulated trailer brake output command signal having a duty cycle. In such embodiments, the trailer brake output circuit 122 may generate the trailer brake output signal in proportion to the duty cycle of the pulse-width modulated trailer brake output command signal. However, it should be understood that in other embodiments, the trailer brake output circuit 122 may output the trailer brake output signal in response to a trailer brake output command signal having a waveform other than a pulse-width modulated waveform.

It should be understood that, while various ECUs of system 102 are described as being configured to perform various operations, other ECUs of the system 102 may perform these operations. Further, the operations of multiple ECUs could instead be carried out by a single ECU, and the operations performed by a given ECU could instead be carried out by multiple ECUs.

Figure 2:
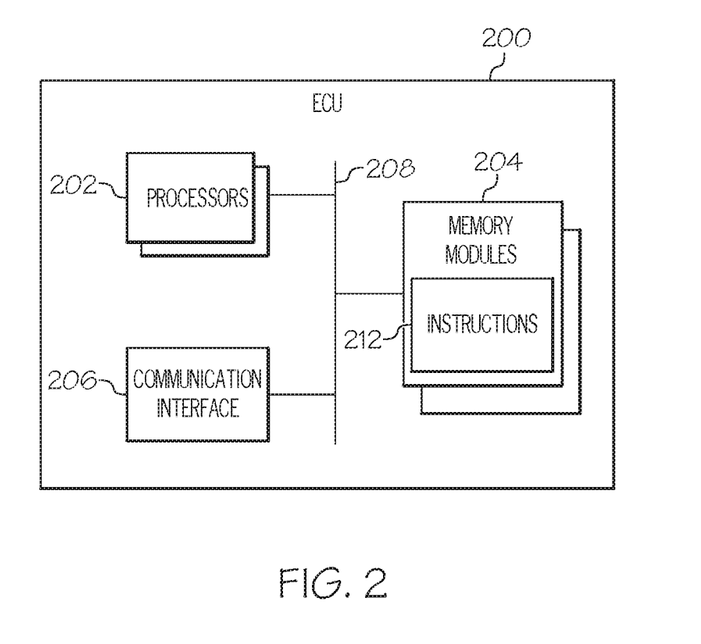
FIG. 2 depicts a block diagram of an electronic control unit (ECU), according to one or more embodiments shown and described herein.

FIG. 2 depicts a block diagram of an electronic control unit (ECU), according to one or more embodiments shown and described herein. As shown, an ECU 200 includes one or more processors 202, one or more memory modules 204, and a communication interface 206, each of which are communicatively coupled via a communication path 208. Any one or more of the brake ECU 110, the airbag ECU 112, and the trailer brake control ECU 120 may take the form of the ECU 200, and may include different and/or additional components. For example, the trailer brake control ECU 120 may include the trailer brake output circuit 122 in addition to any one or more of the components of the ECU 200. Moreover, one or more other components of the system 102, including the MCP sensor 142, the accelerometer 144, and/or the EPB toggle input 146 may take a form similar to the ECU 200 and may be communicatively coupled via the communication path 208.

Each of the one or more processors 202 may be any device capable of executing machine readable instructions, such as machine readable instructions 212, stored in the one or more memory modules 204. Accordingly, each of the one or more processors 202 may be a controller, an integrated circuit, a microchip, a computer, or any other computing device.

The one or more memory modules 204 may comprise RAM, ROM, flash memories, hard drives, or any device capable of storing machine readable instructions 212 such that the machine readable instructions can be accessed and executed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The communication interface 206 may be configured to send one or more state flags, vehicle acceleration messages, or other communication to one or more other ECUs or components of system 102 via the communication path 208 and the communication path 105.

The communication path 208 may take a form similar to the communication path 105, and may be communicatively coupled to the communication path 105. The one or more processors 202 and/or the one or more memory modules 204 may be communicatively coupled to the other components of the system 102 by the communication path 105 and the communication path 208. For example, the brake ECU 110 and the trailer brake control ECU 120 may comprise respective processors that are each communicatively coupled via communication path 105 and respective communications paths of the ECUs. Accordingly, the communication path 105 may communicatively couple any number of processors with one another, and allow the components coupled to the communication path 105 to operate in a distributed computing environment. For example, each of the components may operate as a node that may send and/or receive data.

FIG. 3 depicts communication between a brake ECU and a trailer brake control ECU, according to one or more embodiments shown and described herein. As shown, the brake ECU 110 transmits a dynamic EPB state flag 302 and a vehicle acceleration message 304, and the airbag ECU 112 transmits a vehicle acceleration message 306 (which could take a form similar to vehicle acceleration message 304). In an embodiment, the ECUs (including brake ECU 110) transmit these messages to trailer brake control ECU 120, and trailer brake control ECU 120 receives the messages from the brake ECU 110 and/or other ECUs. Additional details regarding the dynamic EPB state flag 302 and the vehicle acceleration message 304 are discussed throughout the disclosure.

The dynamic EPB state flag 302 indicates a state of the electronic parking brake 184. In one embodiment, the state of the electronic parking brake 184 takes the form of an indication whether the electronic parking brake 184 is enabled (e.g., based on input received by the brake ECU 110 from the EPB toggle input 146). In another embodiment, the state of the electronic parking brake 184 could be an indication whether the dynamic EPB function 111 is controlling the electronic parking brake 184—e.g., by preventing or cycling actuation of the electronic parking brake 184 if the speed of the towing vehicle 100 exceeds a threshold speed, or by actuating the electronic parking brake 184 if the speed of the towing vehicle 100 is equal to or less than the threshold speed. In still another embodiment, the state of the electronic parking brake could take the form of an indication whether the electronic parking brake 184 is actuated (e.g., by the brake ECU 110 or the dynamic EPB function 111 of the brake ECU 110).

The dynamic EPB state flag 302 may indicate an ON state of the electronic parking brake 184—e.g., if the electronic parking brake 184 is enabled, if the dynamic EPB function 111 is controlling the electronic parking brake 184, or if the electronic parking brake 184 is actuated. As another possibility, the dynamic EPB state flag 302 may indicate an OFF state of the electronic parking brake 184—e.g., if the electronic parking brake 184 is disabled, if the dynamic EPB function 111 is not controlling the electronic parking brake 184, or if the electronic parking brake 184 is not actuated. In an embodiment, the dynamic EPB state flag 302 indicates one of an ON state and an OFF state of the electronic parking brake 184, but those of skill in the art will appreciate that the dynamic EPB state flag 302 may indicate other states of the electronic parking brake 184 as well.

The vehicle acceleration message 304 may indicate an acceleration of the towing vehicle 100, which in turn may be based on an acceleration of the towing vehicle 100 as measured by the accelerometer 144. The acceleration may indicate a positive acceleration, indicating that the speed of the towing vehicle 100 is increasing, or may indicate a negative acceleration (i.e., a deceleration), indicating that the speed of the towing vehicle 100 is decreasing. In an embodiment, the vehicle acceleration message 304 takes the form of the acceleration measured by the accelerometer 144. In another embodiment, the acceleration value takes the form of a value generated by the brake ECU 110 by applying zero-point logic to the acceleration measured by the accelerometer 144 so as to decrease variability in the measured acceleration. For example, the brake ECU 110 may generate the acceleration value by determining an acceleration at a point when a driver is judged to begin braking (e.g., based on master cylinder pressure measured by the MCP sensor 142), and then determining future acceleration relative to the acceleration when the driver began braking.

Figure 4:
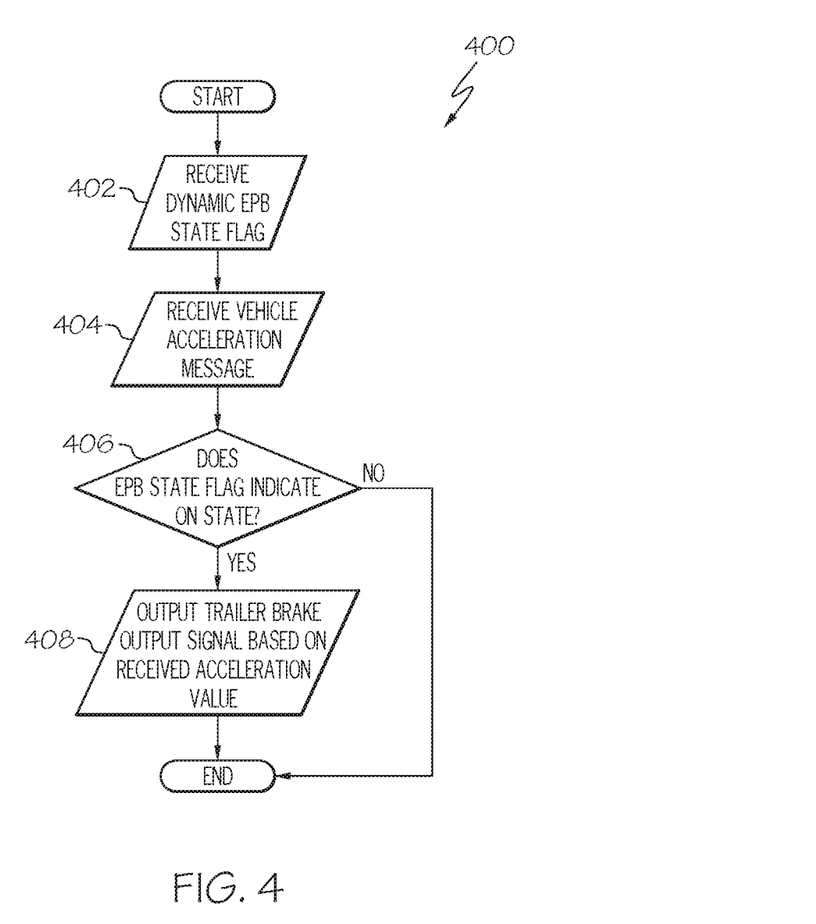
FIG. 4 depicts a flowchart of a method carried out by vehicle control system 102, according to one or more embodiments shown and described herein.

FIG. 4 depicts a flowchart of a method carried out by system 102, according to one or more embodiments shown and described herein.

As shown in FIG. 4, a method 400 begins at step 402 with the trailer brake control ECU 120 receiving dynamic EPB state flag 302 from the brake ECU 110 via the communication path 105. At step 404, the trailer brake control ECU 120 receives the vehicle acceleration message 304 from the brake ECU 110 or from the accelerometer 144 via communication path 105. The dynamic EPB state flag 302 indicates one of an ON state and an OFF state of the dynamic EPB of towing vehicle 100. Additional details regarding the dynamic EPB state flag 302 and the vehicle acceleration message 304 are provided above. Though FIG. 4 shows step 402 before step 404, those of skill in the art will understand that steps 402 and 404 may be carried out in any order, and that the steps of the method 400 may be carried out in any order unless otherwise stated.

At step 406, the trailer brake control ECU 120 determines whether the received dynamic EPB state flag 302 indicates the ON state. In response to determining that the received dynamic EPB state flag 302 indicates the ON state, the trailer brake control ECU 120, at step 408, outputs the trailer brake output signal 125 based on the received vehicle acceleration message 304. Outputting the trailer brake output signal 125 could involve, for example, trailer brake output circuit 122 (of trailer brake control ECU 120) providing trailer brake output signal 125 to trailer 150 via a communication path. The trailer brake output signal, when received by the trailer 150, may cause trailer brakes 152 of trailer 150 to actuate.

The trailer brake control ECU 120 may output the trailer brake output signal 125 based on the vehicle acceleration message 304 using the TBC EPB function 123. The trailer brake control ECU 120 may utilize the TBC EPB function 123 under various scenarios based on one or more state flags, vehicle acceleration messages, or other communication received from one or more other ECUs or components of system 102. In an embodiment, the trailer brake control ECU 120 outputs the trailer brake output signal 125 using the TBC EPB function 123 if the dynamic EPB state flag 302 indicates the ON state of the of the dynamic EPB function 111.

In some embodiments, the trailer brake control ECU 120 initially outputs the trailer brake output signal 125 (using the TBC EPB function 123) based on an MCP pressure measurement received from the MCP sensor 142. The MCP pressure measurement may indicate that a pressure applied to a brake pedal of the towing vehicle exceeds a threshold pressure, and that a brake of the towing vehicle 100 (e.g., the primary brake 182 and/or the electronic parking brake 184) is being activated by a driver. Subsequently, at step 406, the trailer brake control ECU 120 determines whether the received dynamic EPB state flag 302 indicates the ON state. If the trailer brake control ECU 120 determines that the received dynamic EPB state flag 302 indicates the ON state, then the trailer brake control ECU 120 stops output of the trailer brake output signal 125 based on the pressure signal received from the MCP sensor 142, and instead outputs the trailer brake output signal 125 based on the vehicle acceleration message 304 using the TBC EPB function 123. Then, the trailer brake output signal would be based on acceleration of the towing vehicle 100, rather than pressure applied to a brake pedal of the towing vehicle 100.

Outputting the trailer brake output signal 125 based on the vehicle acceleration message 304 may involve determining that the vehicle acceleration message 304 indicates a negative acceleration (i.e., a deceleration) of the towing vehicle 100. As another possibility, outputting the trailer brake output signal 125 may involve determining that the vehicle acceleration message 304 indicates a positive acceleration, indicating that the speed of the towing vehicle 100 is increasing.

A TBC EPB function 123 according to one or more embodiments shown and described herein utilizes the primary brake 182 and the electronic parking brake 184 of the towing vehicle 100 in addition to controlling the trailer brakes 152 in order to reduce stopping distance of the towing vehicle 100 and the trailer 150. In some embodiments, the TBC EPB function 123 causes smooth operation of the trailer brakes 152 and prevents the driver from feeling an abrupt stop.

Figure 5:
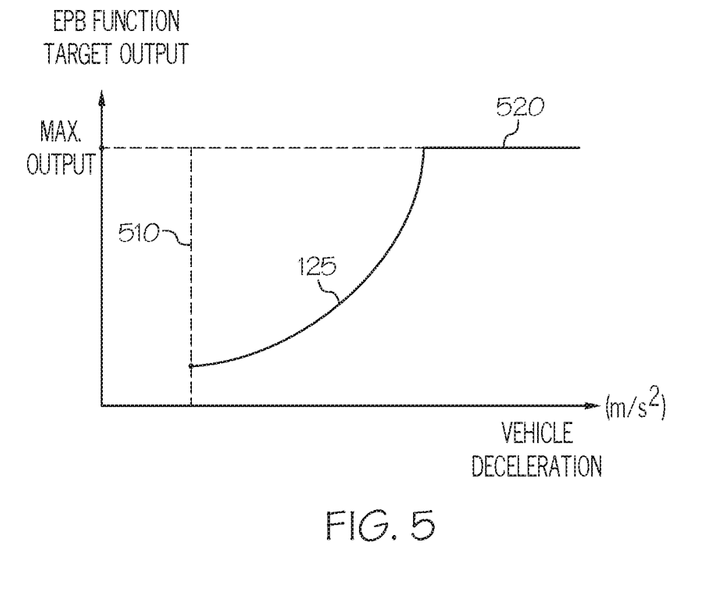
FIG. 5 depicts a graph illustrating a trailer brake control electronic parking brake (TBC EPB) function, according to one or more embodiments shown and described herein.

As shown in FIG. 5, the output (y-axis) of a trailer brake output signal 125 by the TBC EPB function 123 is a function of the deceleration of the towing vehicle 100 (x-axis). TBC EPB function 123 outputs trailer brake output signal 125 if the deceleration exceeds a threshold deceleration 510. The output increases in a non-linear manner as the deceleration of the towing vehicle 100 increases (though a linear output could be used instead or in addition to a non-linear output), up to an EPB function target output 520 (which may be determined based on a gain setting, for example). In an embodiment, the TBC EPB function 123 outputs the trailer brake output signal 125 based on the deceleration of the towing vehicle 100, but not based on a pressure applied to a brake pedal of the towing vehicle 100.

It should now be understood that one or more embodiments described herein provide systems for outputting a trailer brake output signal based on an indicated acceleration of a towing vehicle if a dynamic EPB state flag indicates an ON state. Accordingly, embodiments of the disclosure may provide vehicle control systems that are more reliable and avoid problems of locking up in the trailer brakes due to excessive brake force applied to the trailer.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle control system of a vehicle, the vehicle control system comprising:
   a trailer brake control electronic control unit (ECU) comprising:
      a trailer brake output circuit;
      one or more processors; and
      one or more memory modules comprising machine readable instructions that cause the trailer brake control ECU to perform at least the following when executed by the one or more processors:
         receive a dynamic electronic parking brake (EPB) state flag indicating one of an ON state and an OFF state of a dynamic EPB;
         receive a vehicle acceleration message indicating an acceleration of the vehicle; and
         output, via the trailer brake output circuit, a trailer brake signal based on the acceleration of the vehicle indicated by the received vehicle acceleration message in response to determining that the received dynamic EPB state flag indicates the ON state.

2. The vehicle control system of claim 1, wherein the machine readable instructions stored in the one or more memory modules further cause the trailer brake control ECU to:
   receive a master cylinder pressure measurement (MCP) indicating a pressure applied to a brake pedal of the vehicle,
   output a trailer brake output signal based on the pressure indicated by the received MCP measurement; and
   in response to determining that the dynamic EPB state flag indicates the ON state, (i) stop the output of the trailer brake output signal based on the pressure indicated by the received MCP measurement, and (ii) output the trailer brake signal based on the acceleration of the vehicle indicated by the received vehicle acceleration message,
   wherein the trailer brake output signal based on the acceleration of the vehicle is not based on the pressure indicated by the received MCP measurement.

3. The vehicle control system of claim 2, further comprising a brake ECU configured to control a primary brake of the vehicle based on the pressure indicated by the received MCP measurement.

4. The vehicle control system of claim 1, further comprising a brake ECU comprising a dynamic EPB function controlling the dynamic EPB, and wherein the dynamic EPB state flag indicating one of the ON state and the OFF state of the dynamic EPB comprises a flag indicating one of an ON state and an OFF state of the dynamic EPB function.

5. The vehicle control system of claim 1, wherein the dynamic EPB state flag indicating the ON state of the dynamic EPB comprises a flag indicating that the dynamic EPB is actuated, and wherein the dynamic EPB state flag indicating the OFF state of the dynamic EPB comprises a flag indicating that dynamic EPB is not actuated.

6. The vehicle control system of claim 1, wherein the vehicle control system further comprises an accelerometer, and wherein the vehicle acceleration message is based on the acceleration measured by the accelerometer.

7. The vehicle control system of claim 1, wherein the acceleration of the vehicle comprises a negative acceleration of the vehicle.

8. A vehicle control system of a vehicle, the vehicle control system comprising:
   a trailer brake control electronic control unit (ECU) comprising a trailer brake output circuit, the trailer brake control ECU configured to:
      receive a dynamic electronic parking brake (EPB) state flag indicating one of an ON state and an OFF state of a dynamic EPB;
      receive a vehicle acceleration message indicating an acceleration of the vehicle; and
      output, via the trailer brake output circuit, a trailer brake signal based on the acceleration of the vehicle indicated by the received vehicle acceleration message in response to determining that the received dynamic EPB state flag indicates the ON state.

9. The vehicle control system of claim 8, wherein the trailer brake ECU is configured to:
   receive a master cylinder pressure measurement (MCP) indicating a pressure applied to a brake pedal of the vehicle;
   output a trailer brake output signal based on the pressure indicated by the received MCP measurement; and
   in response to determining that the dynamic EPB state flag indicates the ON state, (i) stop the output of the trailer brake output signal based on the pressure indicated by the received MCP measurement, and (ii) output the trailer brake signal based on the acceleration of the vehicle indicated by the received vehicle acceleration message, wherein the trailer brake output signal based on the acceleration of the vehicle is not based on the pressure indicated by the received MCP measurement.

10. The vehicle control system of claim 9, further comprising a brake ECU configured to control a primary brake of the vehicle based on the pressure indicated by the received MCP measurement.

11. The vehicle control system of claim 8, further comprising a brake ECU comprising a dynamic EPB function controlling the dynamic EPB, and wherein the dynamic EPB state flag indicating the ON state of the dynamic EPB comprises a flag indicating an ON state of the dynamic EPB function, wherein the dynamic EPB state flag indicating the OFF state of the dynamic EPB comprises a flag indicating an OFF state of the dynamic EPB function.

12. The vehicle control system of claim 8, wherein the dynamic EPB state flag indicating the ON state of the dynamic EPB comprises a flag indicating that the dynamic EPB is actuated, and wherein the dynamic EPB state flag indicating the OFF state of the dynamic EPB comprises a flag indicating that dynamic EPB is not actuated.

13. The vehicle control system of claim 8, wherein the vehicle control system further comprises an accelerometer, and wherein the vehicle acceleration message is based on the acceleration measured by the accelerometer of the vehicle control system.

14. The vehicle control system of claim 8, wherein the acceleration of the vehicle comprises a negative acceleration of the vehicle.

15. A method of controlling a trailer brake output circuit of a vehicle, the method comprising:
receiving, by a trailer brake control electronic control unit (ECU) of the vehicle, a dynamic electronic parking brake (EPB) state flag indicating one of an ON state and an OFF state of a dynamic EPB;
receiving, by the trailer brake control ECU, a vehicle acceleration message indicating an acceleration of the vehicle; and
outputting, by the trailer brake control ECU, via the trailer brake output circuit, a trailer brake signal based on the acceleration of the vehicle indicated by the received vehicle acceleration message in response to determining that the received dynamic EPB state flag indicates the ON state.

16. The method of claim 15, further comprising:
receiving, by the trailer brake ECU, a master cylinder pressure measurement (MCP) indicating a pressure applied to a brake pedal of the vehicle,
outputting, via the trailer brake output circuit, a trailer brake output signal based on the pressure indicated by the received MCP measurement; and
in response to determining that the dynamic EPB state flag indicates the ON state, (i) stopping the output of the trailer brake output signal based on the pressure indicated by the received MCP measurement, and (ii) outputting the trailer brake signal based on the acceleration of the vehicle indicated by the received vehicle acceleration message,
wherein the trailer brake output signal based on the acceleration of the vehicle is not based on the pressure indicated by the received MCP measurement.

17. The method of claim 16, wherein a brake ECU is configured to control a primary brake of the vehicle based on the pressure indicated by the received MCP measurement.

18. The method of claim 15, wherein a brake ECU comprises a dynamic EPB function controlling the dynamic EPB, and wherein the dynamic EPB state flag indicating one of the ON state and the OFF state of the dynamic EPB comprises a flag indicating one of an ON state and an OFF of the dynamic EPB function.

19. The method of claim 15, wherein the dynamic EPB state flag indicating the ON state of the dynamic EPB comprises a flag indicating that the dynamic EPB is actuated, and wherein the dynamic EPB state flag indicating the OFF state of the dynamic EPB comprises a flag indicating that dynamic EPB is not actuated.

20. The method of claim 15, wherein the acceleration of the vehicle comprises a negative acceleration of the vehicle.

* * * * *